J. L. Dutton, Sr.,
Anti-Friction Roller.

Nº 26,483.　　　　　　Patented Dec. 20, 1859.

Witnesses
Henry Howson
Horace See

Inventor
Joseph L Dutton Sen

UNITED STATES PATENT OFFICE.

JOSEPH L. DUTTON, SR., OF PHILADELPHIA, PENNSYLVANIA.

ANTIFRICTION-BOX.

Specification of Letters Patent No. 26,483, dated December 20, 1859.

*To all whom it may concern:*

Be it known that I, JOSEPH L. DUTTON, Sr., of the city and county of Philadelphia and State of Pennsylvania, have invented a new and useful Improvement in Antifriction-Boxes; and I do hereby declare the following to be a full, clear, and exact description of the same, reference being had to the accompanying drawing and to the letters of reference marked thereon.

My invention relates to an improvement in the rollers used for anti-frictional purposes between revolving and stationary objects, such as swing bridges, turn-tables, shafts to which an excessive end strain is imparted, &c., and my improvement consists in interposing between a revolving and stationary surface any convenient number of beveled rollers so formed that a portion of the roller on which the revolving surface bears shall be larger in diameter than the portion or portions of the same roller which bears on the stationary surface, as more fully described hereafter in order that the said rollers may move more freely and smoothly and be less liable to slip, wear, and produce friction than ordinary cone-shaped rollers.

In order to enable others to make and use my invention, I will now proceed to describe its construction and operation.

Figure 1:
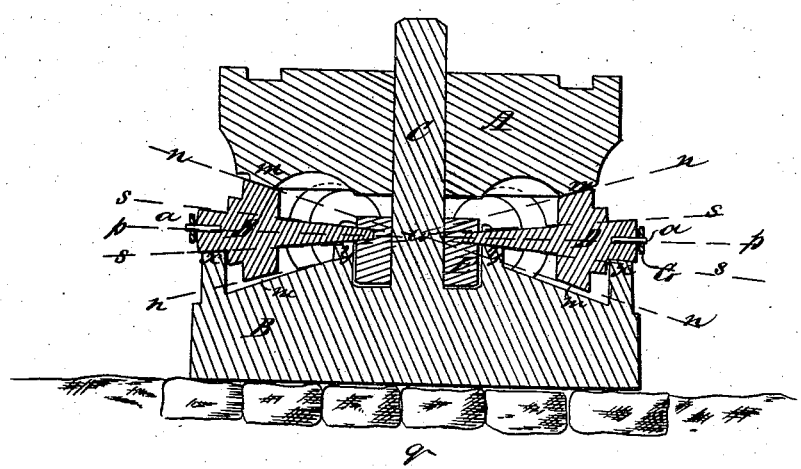
Figure 2:
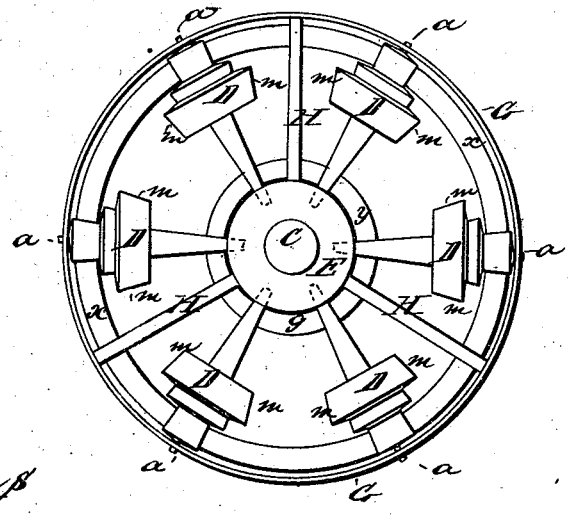

In reference to the accompanying drawing which forms a part of this specification, Figure 1, is a sectional elevation of my improved anti-friction box; Fig. 2, a ground plan with the upper portion of the box removed.

A represents the movable plate and B the fixed plate of the box, the latter having a central spindle or pin C passing through the former, so as to maintain the plates concentric with each other.

D, D, are any convenient number of anti-friction rollers intervening between the upper and lower plates of the box. The tapering ends of these rollers fit looesly so as to turn freely in a central hub E which surrounds the spindle C, and which is adapted to a recess formed in the lower and stationary portion B of the box, so that it can turn easily therein, the hub being at all times free from contact with the bottom of the recess. A pin *a* is secured to or forms part of each roller, and this pin passes through and turns freely in a ring G which is connected by two, three, or more arms H, to the central hub E, the ring thus serving the double purpose of maintaining the rollers at an equal distance apart from each other and of resisting the outward thrust of the rollers caused by their tapering form and the superincumbent pressure. The bearing surface of the movable plate of the box is on the portion *m* of the rollers, where they are of the greatest diameter, this portion of the rollers being at all times free from contact with the fixed plate B of the box. The bearing point *m* is on a bevel proportioned to the diameter of the rollers and that of the bearing surface in contact with the rollers, this bevel, indicated by the line *n*, being such as would represent the pitch lines of a bevel cog wheel of similar proportions. The bearing surface of the rollers D on the stationary portion of the box, is at two points *x* and *y*, both of which are also on bevels proportioned to the diameters of the rollers, and those of the two bearing surfaces, the bevel which is represented by the line *s*, being equivalent to the pitch line of the teeth of two bevel wheels having diameters of similar proportions.

Tapering or conical rollers have been heretofore interposed between a revolving and fixed plate for the purpose of avoiding friction. In all cases, however, the bearing point of the upper plate on the roller and that of the latter on the lower plate have been the same. The difficulty attending the use of conical anti-friction rollers is the readiness with which they slip on the presentation to their surfaces of the slightest inequality or obstruction. This slipping of the rollers causes them to wear on the surface so that they eventually become more or less uneven and cease to perform the duty intended. In my invention I overcome this difficulty by making that portion of each conical roller on which the revolving plate *a* bears much larger in diameter than those portions of the rollers which bear on the lower and fixed plate D. It is this special feature which distinguishes my invention from ordinary conical anti-friction rollers in which the portion of each roller on which the upper plate bears is the same as that which bears on the lower or fixed plate. As the power applied to turn each roller on its axis and to revolve it over the face of the lower plate is applied at the point where the roller has the largest diameter and as the point where any obstructions may be presented to the free traverse of the roller takes place where the said roller is smaller in diameter, it will be evident that the resistence to prevent the traverse of the roller and to prevent it from turning freely on its axis will be less than if it was presented at the point where the largest diameter of the roller occurs, in other words, the power applied to turn the roller on its axis and cause it to traverse the track of the stationary plate is transmitted through a leverage of greater or less power according to the difference between the diameter of the roller at the point which receives the upper plate and that at the point where it bears on the lower plate.

It will be evident without further description that the rollers constructed and arranged in respect to the plates as above described must be more free and smooth in their action and be less liable to slip and produce friction than those of ordinary construction.

In the drawing my improved friction box is of a form applicable for use in connection with a pivot bridge, turn table, or other like heavy object which has to be moved around without much friction, the plate B being in this case secured to the foundation and the plate A to the under side of the bridge or turn table. It will be readily seen, however, that my improvement is applicable to horse powers, to vertical shafts, and to horizontal and diagonal shafts on which an excessive end strain is exerted.

Without confining myself to the form of the plates herein described or to the method of maintaining the rollers at an equal distance apart, I claim as my invention, and desire to secure by Letters Patent—

Interposing between a revolving and stationary surface any convenient number of beveled anti-friction rollers so formed that the portion of each roller on which the revolving surface bears shall be larger in diameter than the portions or portion of the roller which bear on the stationary plate, as herein set forth.

In testimony whereof, I have signed my name to this specification before two subscribing witnesses.

JOSEPH L. DUTTON, Senr.

Witnesses:
HENRY HOWSON,
CHARLES D. FREEMAN.